UNITED STATES PATENT OFFICE.

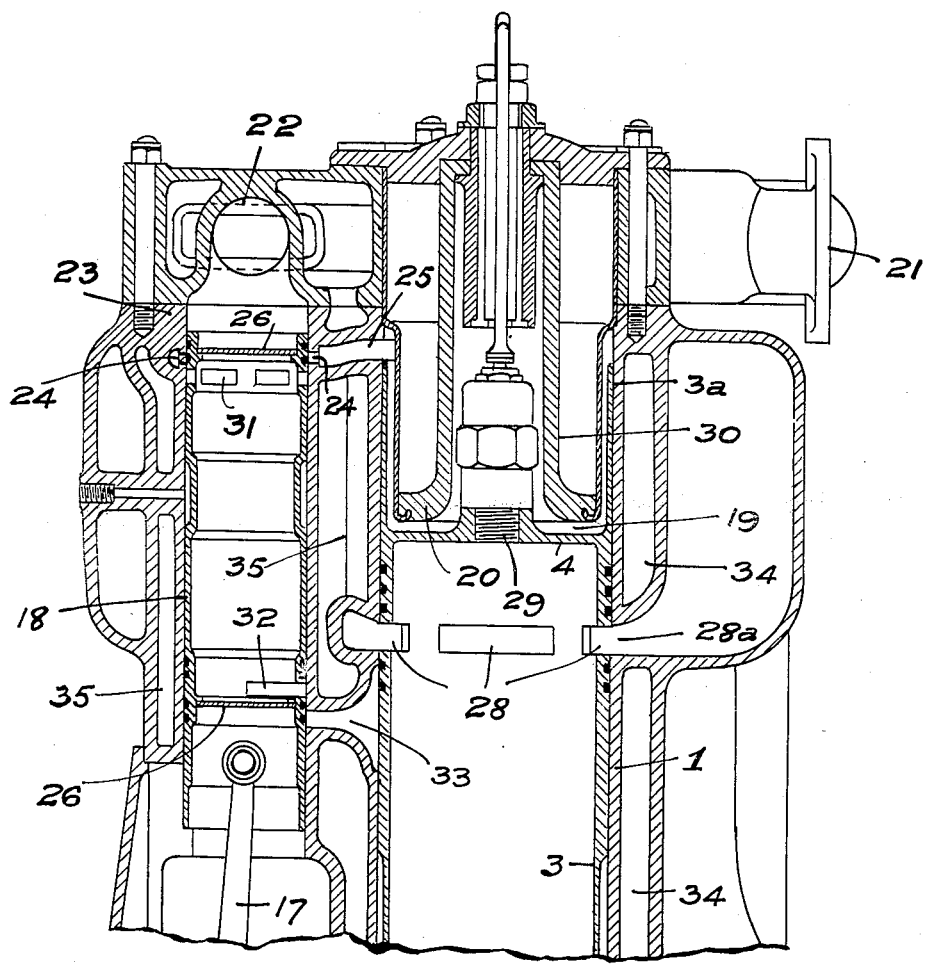

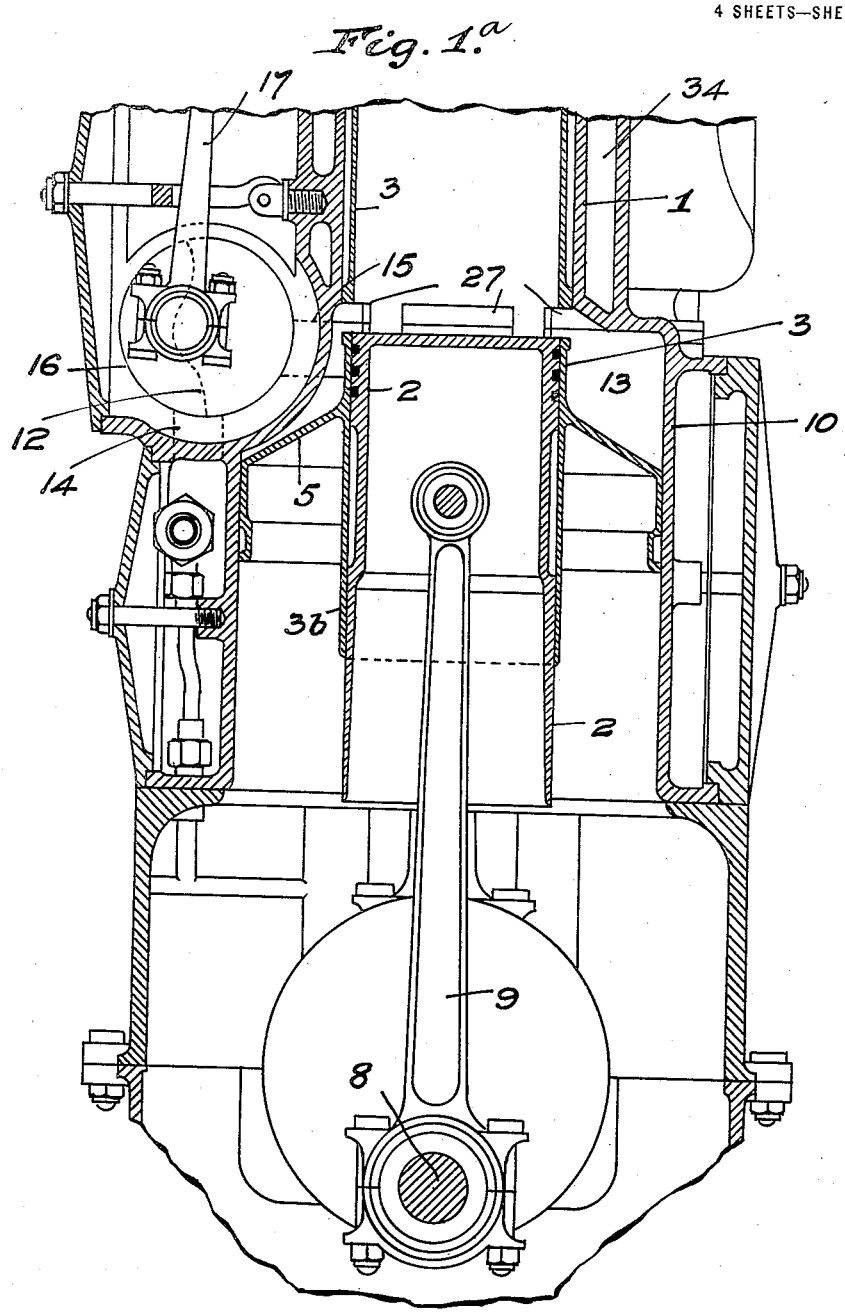

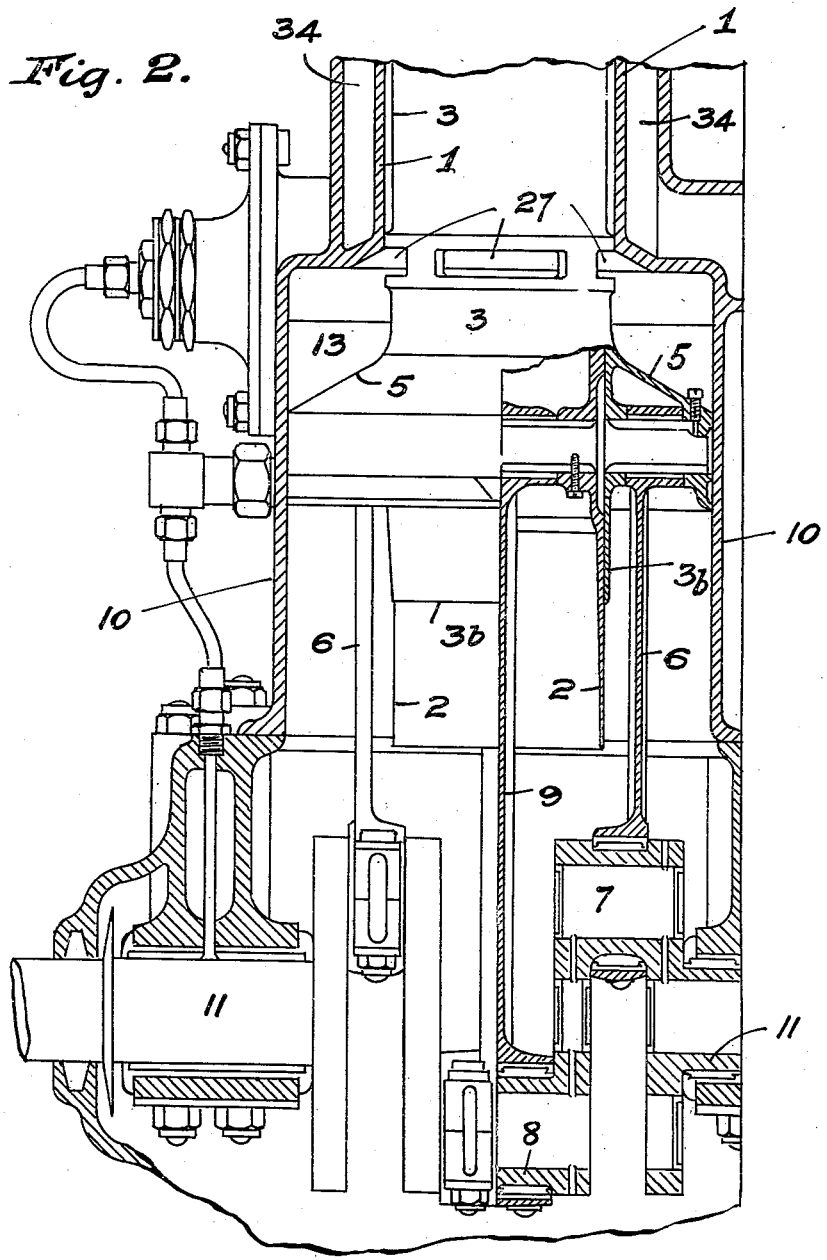

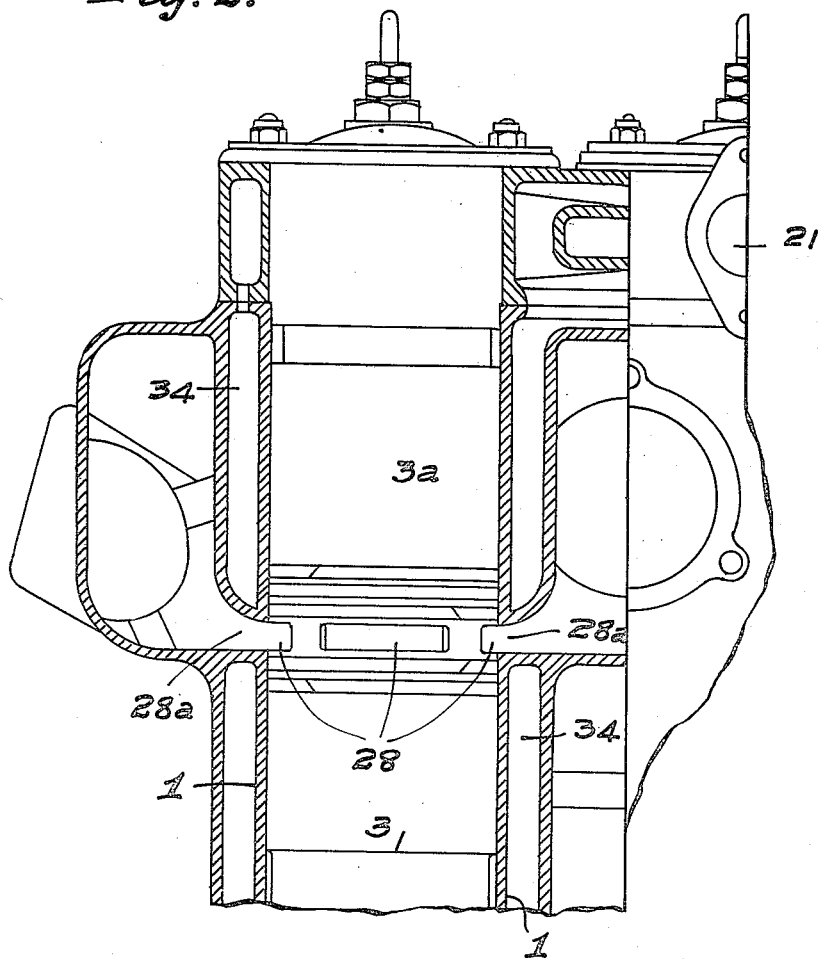

THEOPHILUS JAMES BRADLEY DRAYTON, OF NEW BRIGHTON, ENGLAND.

INTERNAL-COMBUSTION ENGINE.

1,290,935.           Specification of Letters Patent.      Patented Jan. 14, 1919.

Application filed October 15, 1917. Serial No. 196,760.

*To all whom it may concern:*

Be it known that I, THEOPHILUS JAMES BRADLEY DRAYTON, a subject of the King of Great Britain, and a resident of New Brighton, Birkenhead, England, have invented certain new and useful Improvements in Internal-Combustion Engines, of which the following is a specification.

This invention relates to improvements in internal combustion engines of the two stroke cycle type and in which the pistons oppositely reciprocate. In such engines air and combustible mixture have been primarly compressed in cylinders or receivers and delivered into the working space of the cylinder, the combustible mixture passing through a control valve; and in internal combustion engines having oppositely moving pistons, one of which slides within a sleeve forming the other piston, the sleeve has been provided with an enlarged annular piston for compressing the charge of air and combustible mixture. The present invention may be applied to utilize any class of hydrocarbon fuel. The invention has for its object an improved type of two stroke cycle internal combustion engine in which a higher volumetric efficiency may be obtained without a corresponding increase in the maximum compression temperature, a development of greater power at high speeds than is possible in previous two stroke cycle engines, and a reduction of vibration and wear and of the space required in the engine for the production of a given power. A further feature of the invention lies in the fact that a lighter type of engine may be built for a given horse power.

According to this invention a charge of air compressed above the pressure of the atmosphere is pumped into the working cylinder to expel the exhaust gases and is compressed therein, a further charge of hydrocarbon fuel being subsequently pumped into the working cylinder, so that a supercompression is obtained and an amount of energy thereby generated on the firing stroke which is sufficient to provide at least the power derived from the consumption of the same quantity of fuel in the usual type of four stroke engine plus the power required for the negative work absorbed in pumping the compressed air charge and fuel mixture into the working cylinder.

In carrying out the invention the spent gases are scavenged from the working cylinder by a charge of air, this scavenging air being previously compressed within a receiver the capacity of which is greater than that of the working cylinder. After the spent gases have been expelled by the compressed air, the air charge which is at atmospheric pressure or slightly above is trapped within the working cylinder, and on the next inward compression stroke, and slightly after the commencement of that stroke, a charge of combustible mixture which has been previously compressed is injected into the working cylinder, the whole combined charge being then compressed and fired. The charge taken into the working cylinder is compressed to a degree greater than that normally obtaining, but, owing to the greater proportion of air in the charge than that usually obtaining, preignition is prevented from taking place. Further, as all ports to working cylinder except the fuel injection port are closed when the fuel component of the charge is being injected into the cylinder no waste of fuel takes place, a certain proportion of the fuel under present conditions of two stroke cycle engines being swept out with the exhaust of the previous cycle by the incoming charge.

An engine in accordance with this invention is shown in the accompanying drawings, in which Figures 1 and 1ª show a section through the axis of one engine cylinder and its piston valve for controlling the inlet of the fuel thereto, the drawings showing one unit only of a multiple cylinder engine. Figs. 2 and 2ª show a medial section in a plane at right angles to Fig. 1.

In the construction shown, each cylinder 1 of the engine is provided with oppositely reciprocating piston elements, one piston element 2 being an ordinary trunk type piston reciprocating within the other element 3 which takes the form of a movable cylinder closed at its top end 4 having an enlarged piston 5 at its lower end which is coupled by twin connecting rods 6 to crank pins 7 disposed at 180 degrees with reference to the crank pin 8 to which the piston 2 is coupled by a connecting rod 9. This movable cylinder 3 reciprocates within the outer fixed cylinder 1, the lower part of which is enlarged at 10 to form a cylinder and receiver within which works the enlarged annular piston 5 adapted to compress a charge of air for scavenging the spent gases. Driven from the main shaft 11 in any suitable manner and at the same revolutions per minute, is a rotary air valve 12 controlling the inlet from the atmosphere to the scavenging chamber 13 by way of the ports 14 and 15 and on the same spindle as the rotary valve 12 is a crank disk 16 or the like, driving through a connecting rod 17 a hollow piston valve 18 which is adapted to control the inlet of the combustible mixture from the carbureter or the like to a primary mixture chamber 19 between the head of the moving cylinder 3 and the end 20 of the fixed outer cylinder.

The combustible mixture inlet 21 from the carbureter communicates by way of a port 22 with the head of the piston valve casing 23 and on the downward stroke of the piston valve 18 ports 24 are uncovered, permitting combustible mixture to pass by way of the passage 25 to the primary mixture chamber 19 in the top of the fixed cylinder 1. The hollow valve 18 is inclosed by diaphragms or caps 26. The interior of this piston valve forms a chamber into which the combustible mixture is delivered compressed from the mixture chamber 19 and from whence it is afterward passed into the firing space between the two pistons 2 and 3. The rotary air valve 12 and the hollow piston valve 18 may be suitably driven by helical gears from the crank shaft 11, others gears driven from this shaft driving a lubricating oil pump and a magneto, or these may be driven by any other convenient means. The air is passed by way of the rotary air valve into the compressed air receiver chamber 13 in the enlarged part of the fixed cylinder and is compressed therein by the annular piston 5, the air flowing through ports 27 in the moving cylinder wall when these ports in the moving cylinder are uncovered by the piston proper 2, the air then entering the working cylinder and scavenging out the exhaust gases through ports 28 in the moving cylinder and the exhaust ports 28ª. The sparking plug 29 is carried in the head 4 of the moving cylinder 3 and the head end 20 of the fixed outer casing cylinder 1 is suitably shaped at 30 to allow the plug to telescope into it.

The piston valve 18 is provided with an upper series of ports 31 adapted at one portion of its stroke to register with the valve casing ports 24, and a port 32 adapted to register with a lower port 33 in the wall of the valve casing communicating with the fixed cylinder 1.

In operation supposing the piston elements 2, 3, to have just been on the exhaust stroke and farthest apart as shown, and now approaching at about, say, one quarter of their inward travel, the rotary air valve 12 is arranged to open putting the scavenging air receiver chamber 13 into communication with the atmosphere by way of ports 14, 15. When the rotary air valve opens to the receiver 13 the ports 27 in the wall of the moving cylinder are closed so that the air admitted by the rotary air valve 12 is trapped in the receiver chamber 13. At this time also the top of the piston valve 18 uncovers the ports 24 in the piston valve casing wall leading to the mixture chamber 19, putting this mixture chamber in communication with the carbureter or the like, and at the same time the exhaust ports 28 in the moving cylinder 3 register with the port 33 leading from the hollow piston valve casing, with which latter port the port 32 in the wall of the piston valve itself then registers, allowing the combustible mixture which has been previously compressed into the interior of the piston valve to pass into the working cylinder through the exhaust ports 28 in the moving cylinder 3. At about three quarters of the in-stroke the exhaust ports 28 in the moving cylinder shut off the inlet port 33 leading from the piston valve casing into the working cylinder. Shortly after this while both pistons are together ignition takes place, and at the extreme inner point of the stroke all the ports are closed.

On the firing stroke the rotary air valve 12 has closed the port 15 leading into the scavenging receiver chamber 13, the piston valve 18 also closes the ports 24 leading from the carbureter to the mixture chamber 19 and also the port 33 in the lower part of the piston valve casing which when open puts the mixture receiving space inside the piston valve into communication with the exhaust ports 28 in the moving cylinder. During the firing stroke the combustible mixture is compressed in the mixture chamber 19, then the ports 24 from the mixture chamber open to the upper ports 31 in the wall of the piston valve communicating with its interior, the piston valve thus receiving a charge of compressed fuel from the mixture chamber 19. At the extreme end of this stroke the rotary air valve 12 is about to open to the atmosphere, but the ports 27 in the moving cylinder are already in communication with the scavenging receiver 13 owing to being uncovered by the piston proper 2. At the end of the stroke the piston valve 18 just closes off the ports 24 leading from the mixture chamber into the hollow interior of the piston valve.

The moving cylinder 3 is provided with an extension or skirt 3ª at the top and a corresponding skirt 3ᵇ at the bottom, the upper skirt 3ª serving to mask the exhaust ports 28ª while the fuel charge is being taken into the mixture chamber 19. Suitable provision is made for jacketing the fixed cylinder at 34 and the piston valve casing at 35 and provision may be made for a forced system of lubrication to the various working parts.

By forming the volume of the scavenging cylinder 13 greater than that of the working cylinder and by compressing the scavenging air charge to a suitable pressure, the spent gases of the previous charge are more completely blown out at even the highest engine speed, the spent gases being evacuated in a shorter time. The negative work absorbed by the compression of this scavenging air charge is more than neutralized by the greater mean effective pressure obtained from the engine, owing to the larger total weight of gas, hydrocarbon and air, pumped into the working cylinder, than usual, this surplus mean effective pressure at least counterbalancing the negative work absorbed in pumping the scavenging air and fuel mixture. A further advantage of the engine lies in the fact that the compressed combustible mixture is completely introduced into the working cylinder on the compression stroke in advance of the ignition point, so that the latter may be conveniently timed and set for the highest or any engine speed. The fuel consumption of an engine in accordance with this invention for an equal brake horse power will be at least no greater than in existing engines, owing to the greater weight of air and hydrocarbon air mixture of normal richness pumped into the cylinder per cycle, which results in a higher compression pressure though not a correspondingly higher maximum compression temperature and causes that part of the charge which is hydrocarbon to be burnt with a greater thermal efficiency than in other engines, this high thermal efficiency resulting in a gain in power, which will compensate for the negative work required in pumping the fuel charge and the scavenging air.

Provision may be made for throttling or controlling the supply of scavenging air by providing a suitable throttle valve, and the supply of air to the receiver chamber may be drawn through the crank case for the purpose of keeping the supply of lubricating oil cool, the air inlets for this purpose being formed as long slots for the purpose of making a greater surface contact with the oil.

The distinguishing features of the invention consist in scavenging the spent gases with a charge of compressed air, then trapping this air charge in the working cylinder and subsequently injecting a fuel charge under pressure into the working cylinder composed of a mixture of hydrocarbon and air. By this arrangement no waste of fuel is permitted to pass out with the exhaust, the working cylinder then having all its ports closed other than the inlet by which the hydrocarbon is injected. It is desirable so to proportion the scavenging receiver volume in relation to that of the working cylinder and the maximum pressure of the scavenging air that the exhaust gases will be completely blown out at the highest engine speed, say, 3,000 revolutions per minute. The resulting mean effective pressure obtained on the firing stroke, owing to the larger total weight of air and hydrocarbon air mixture pumped, though the actual amount of hydrocarbon is no more than usual, the extra weight being air, is far higher than that obtained in previous types of engine, the surplus mean effective pressure counterbalancing the negative work required to pump the scavenging air charge and fuel mixture. And further owing to the higher final compression in the working cylinder that part of the gases which is hydrocarbon is burnt with a greater thermal efficiency.

I claim:

1. In an internal combustion engine of the two stroke cycle type, in combination; a working cylinder; oppositely moving pistons inclosing the working cylinder; a receiver of greater volume than the working cylinder adapted to compress a charge of air for scavenging the spent gases from the working cylinder; means for trapping the scavenging air in the working cylinder and for causing it to be partially compressed therein; means for compressing the fuel component of the firing charge and delivering it into the working cylinder after the scavenging air has been partially compressed therein; and means for finally compressing and firing the combined charge of combustible mixture and scavenging air in the working cylinder.

2. In an internal combustion engine of the two stroke cycle type, in combination; a working cylinder; oppositely moving pistons one working within another of the moving cylinder type to form the working cylinder; a receiver of greater volume than the working cylinder adapted to compress a charge of air for scavenging the spent gases from the working cylinder; means for trapping the scavenging air in the working cylinder and for causing it to be partially compressed therein; means for compressing the fuel component of the firing charge and delivering it into the working cyinder after the scavenging air has been partially compressed therein; and means for finally compressing and firing the combined charge of combustible mixture and scavenging air in the working cylinder.

3. In an internal combustion engine of the two stroke cycle type, in combination; a working cylinder; oppositely moving pistons, one working within another of the moving cylinder type to form the working cylinder; a fixed outer cylinder within which both pistons reciprocate; a receiver of greater volume than the working cylinder adapted to compress a charge of air for scavenging the spent gases from the working cylinder; means for trapping the scavenging air in the working cylinder and for causing it to be partially compressed therein; means for compressing the fuel component of the firing charge and delivering it into the working cylinder after the scavenging air has been partially compressed therein; and means for finally compressing and firing the combined charge of combustible mixture and scavenging air in the working cylinder.

4. In an internal combustion engine of the two stroke cycle type, in combination; a working cylinder; oppositely moving pistons, one working within another of the moving cylinder type to form the working cylinder; a fixed outer cylinder within which both pistons reciprocate; a receiver of greater volume than the working cylinder formed by an enlargement of the outer cylinder; an enlarged piston on the moving cylinder adapted to compress a charge of air in the receiver for scavenging the spent gases from the working cylinder; means for controlling the air inlet to the receiver and its delivery to the working cylinder; means for trapping the scavenging air in the working cylinder and for causing it to be partially compressed therein; means for compressing the fuel component of the firing charge and delivering it into the working cylinder after the scavenging air has been partially compressed therein; and means for finally compressing and firing the combined charge of combustible mixture and scavenging air in the working cylinder.

5. In an internal combustion engine of the two stroke cycle type, in combination; a working cylinder; oppositely moving pistons, one working within another of the moving cylinder type to form the working cylinder; a fixed outer cylinder within which both pistons reciprocate; a receiver of greater volume than the working cylinder adapted to compress a charge of air for scavenging the spent gases from the working cylinder; means for trapping the scavenging air in the working cylinder and for causing it to be partially compressed therein; a receiver chamber in the head of the fixed outer cylinder in which the fuel mixture is primarily compressed and from whence it is delivered into the working cylinder after the scavenging air has been partially compressed therein; and means for finally compressing and firing the combined charge of combustible mixture and scavenging air in the working cylinder.

6. In an internal combustion engine of the two stroke cycle type, in combination; a working cylinder; oppositely moving pistons, one working within another of the moving cylinder type to form the working cylinder; a fixed outer cylinder within which both pistons reciprocate; a receiver of greater volume than the working cylinder adapted to compress a charge of air for scavenging the spent gases from the working cylinder; means for trapping the scavenging air in the working cylinder and for causing it to be partially compressed therein; a receiver chamber in the head of the fixed outer cylinder in which the fuel mixture is primarily compressed; a hollow piston valve adapted to receive the compressed fuel mixture and transfer it into the working cylinder; and means for finally compressing and firing the combined charge of combustible mixture and scavenging air in the working cylinder.

7. In an internal combustion engine of the two stroke cycle type, in combination; a working cylinder; oppositely moving pistons inclosing the working cylinder; a receiver of greater volume than the working cylinder adapted to compress a charge of air for scavenging the spent gases from the working cylinder; a rotary valve for controlling the inlet for air to said receiver; means for trapping the scavenging air in the working cylinder and for causing it to be partially compressed therein; means for compressing the fuel component of the firing charge and delivering it into the working cylinder after the scavenging air has been partially compressed therein; and means for finally compressing and firing the combined charge of combustible mixture and scavenging air in the working cylinder.

8. In an internal combustion engine of the two stroke cycle type, in combination; a working cylinder; oppositely reciprocating pistons one piston working within another of the moving cylinder type; a working space between the pistons into which a scavenging compressed air charge is delivered and subsequently a compressed charge of fuel gas is also delivered; an air receiver chamber in which the scavenging charge is compressed; a rotary air valve controlling the inlet of air to said air receiver chamber; ports in the moving cylinder adapted to admit the compressed air scavenging charge into the working cylinder, said ports being controlled by the inner piston; exhaust ports in the moving cylinder from which the spent gases are scavenged, said exhaust ports also acting as inlet ports for the combustible mixture charge; a mixture chamber in which the combustible mixture charge is primarily compressed; a piston valve controlling the inlet of combustible mixture to the primary mixture chamber and acting as a temporary receiver for transferring the compressed combustible mixture from the primary mixture chamber to the working cylinder; inlet and outlet ports to and from the interior of the piston valve, said outlet ports admitting the fuel charge to the working cylinder by way of the exhaust ports in the moving cylinder.

In testimony whereof I affix my signature in presence of two witnesses.

THEOPHILUS JAMES BRADLEY DRAYTON.

Witnesses:
ALFRED MUNYARD,
P. AIRWOCHER.